(No Model.)
A. P. CLARKE.
RAKE.
No. 316,604. Patented Apr. 28, 1885.
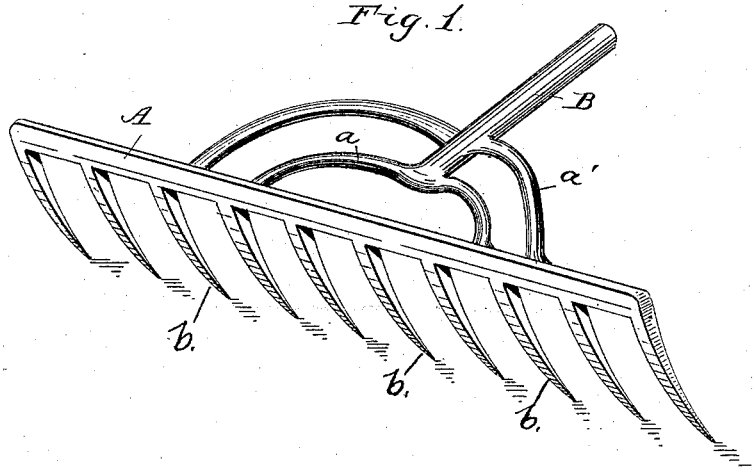
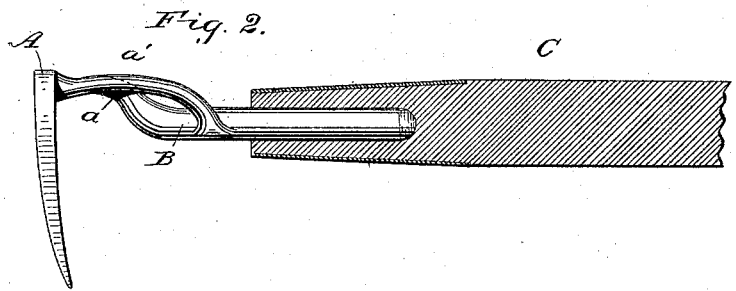

UNITED STATES PATENT OFFICE.

ALANSON P. CLARKE, OF AUBURN, NEW YORK.

RAKE.

SPECIFICATION forming part of Letters Patent No. 316,604, dated April 28, 1885.

Application filed December 8, 1884. (No model.)

*To all whom it may concern:*

Be it known that I, ALANSON P. CLARKE, of Auburn, in the county of Cayuga and State of New York, have invented certain new and useful Improvements in Rakes and other Similar Implements, of which the following is a full, clear, and exact description.

This invention relates to an improvement in garden-rakes or other similar agricultural implements wherein the rake-head, teeth, and shank are made of iron or steel, and is directed, primarily, to the manner of constructing the tang, and the braces by means of which the tang is connected with and secured to the rake-head, and also to the position of the braces with relation to the top of the rake-head, which will be hereinafter more fully described.

It has been my object in this invention to produce a rake which shall be strong and durable, yet comparatively light, and cheaply and inexpensively manufactured, and which shall be so constructed that there will be no danger of the braces which secure the tang to the rake-head being broken by coming in contact with anything in case the rake, after the handle is attached, should accidentally fall or be knocked down teeth uppermost.

The invention consists in the construction and arrangement of parts, as will be hereinafter described, and particularly pointed out in the claim.

In the accompanying drawings, Figure 1 is a perspective view of a rake embodying my improvement. Fig. 2 is a side elevation of a completed rake.

Any of the ordinary well-known methods of manufacturing rakes and forks used for agricultural and other similar purposes will answer for making rakes and forks embodying my invention, which relates to the article *per se* rather than to the process or method employed for producing it. I deem it best, however, to state in the outset that it is my intention to make my rake out of malleable iron or cast-steel.

In the accompanying drawings, which show a rake made in accordance with my invention, A represents the head of the rake, and *b* the teeth thereof. From the head A of the rake extend two braces, *a a'*, the latter being the larger, which surrounds and incloses the smaller brace, *a*, which may span the rake-head any suitable distance between the two ends. The two braces *a* and *a'* are secured to the tang B, the former, *a*, at the inner end of said tang, and the latter, *a'*, to the body portion thereof. The tang is made of sufficient length to permit the attaching of the handle C.

It will be noticed, however, that by providing the rake with two braces arranged as shown in the drawings the rake will be very materially strengthened and rendered more valuable and lasting to the user. It is manifest, however, that I may use three braces, or even more, if desired; but for the sake of economy I have usually made use of only two braces, which seem to answer the purpose admirably.

As at present manufactured the braces which secure the head and tang or shank together are very apt to become broken and thus render the fork or rake thereafter unfit for further use. To guard against any such emergency, I have provided the rake with two braces, one of which surrounds and acts as a protector for the other, as seen in the drawings.

I have also, in order to overcome any liability of the rake or fork getting broken from falling down, or when used teeth uppermost for grading or leveling purposes, arranged the braces *a a'* below the upper edge of the rake-head, and curved or drooped the braces and tang considerably below a line drawn flush with the rake-head.

It will thus be seen that the several parts of the rake, all being made in one piece and arranged as set forth, guard against accidental breakage, will outlast those now commonly used, and yet cost no more to manufacture them.

In my rake represented either one of the braces may be broken, and yet the implement still be suitable for use.

I would state, in conclusion, that the tang or shank may, if desired, extend up to and be secured upon the rake-head, as is the case in some rakes.

What I claim, and desire to secure by Letters Patent, is—

The combination, with the rake-head A, having the teeth $b$, of the braces $a$ $a'$, the former secured to the end of the tang and to the rake-head, the latter secured to the body portion of the tang on each side thereof and to said head, the above parts made integral with each other, and the said braces and tang formed out of line with the rake-head, as and for the purposes described.

In testimony whereof I have hereunto set my hand this 19th day of November, 1884.

ALANSON P. CLARKE.

Witnesses:
GEO. D. KIMBACK,
ROBT. A. DYER, Jr.